March 28, 1961     I. S. BLONDER ET AL     2,977,553
TRANSMISSION LINE AND METHOD OF MAKING THE SAME
Filed April 21, 1958     2 Sheets-Sheet 1
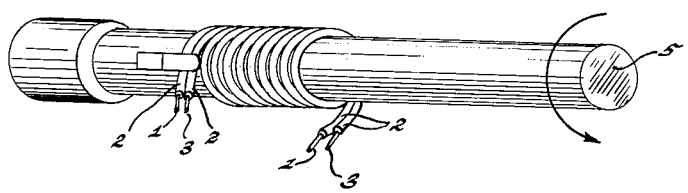
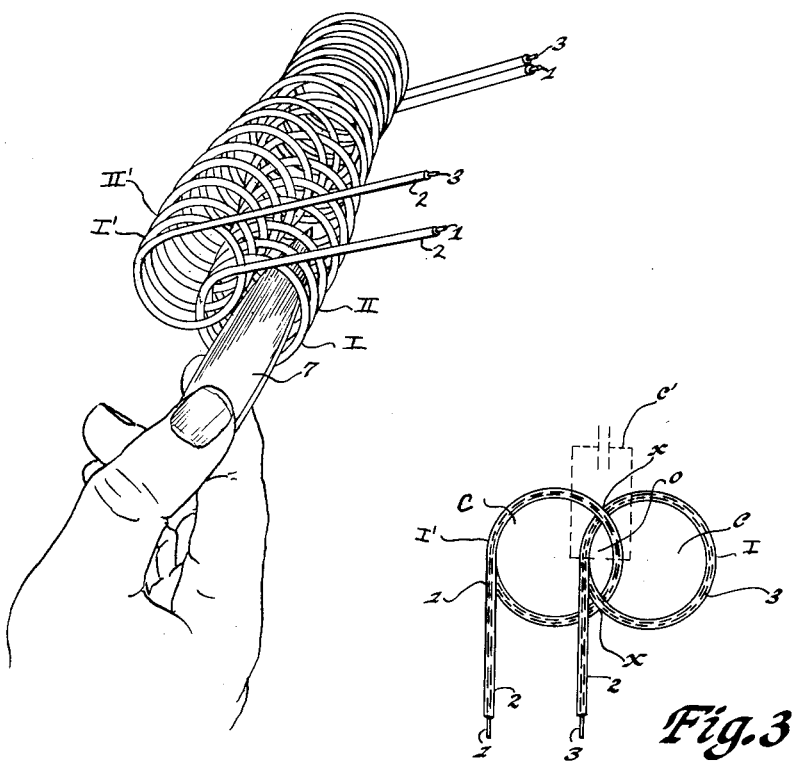
INVENTORS
Isaac S. Blonder
Ben H. Tongue
BY Rines and Rines
ATTORNEYS March 28, 1961     I. S. BLONDER ET AL     2,977,553
TRANSMISSION LINE AND METHOD OF MAKING THE SAME
Filed April 21, 1958     2 Sheets-Sheet 2

INVENTORS
Isaac S. Blonder
Ben H. Tongue
BY Rines and Rines
ATTORNEYS

United States Patent Office 2,977,553
Patented Mar. 28, 1961

2,977,553
TRANSMISSION LINE AND METHOD OF MAKING THE SAME

Isaac S. Blonder and Ben H. Tongue, West Orange, N.J., assignors to Blonder-Tongue Electronics, a corporation of New Jersey Filed Apr. 21, 1958, Ser. No. 729,667
12 Claims. (Cl. 333—33)

The present invention relates to electric transmission lines and methods of making the same, and, more particularly, to two-conductor lines adapted for advantageous use in the radio-frequency spectrum.

While many different types of two-conductor electric transmission lines have been evolved over the years, including parallel-wire, flat-conductor and coaxial lines, it has always been difficult to imbue such lines with high-impedance characteristics. This is because the coextensive lines are inherently capacitively coupled to one another at each point therealong, and the characteristic impedance for a given inductance per unit length, varies inversely as the square-root of the capacitance per unit length. An inherently large capacitance per unit length, therefore, gives rise to a relatively low characteristic impedance.

An object of the present invention, accordingly, is to provide a new and improved method of imbuing two-conductor lines with markedly reduced capacitance per unit length and hence with increased characteristic impedance. In summary, this end is achieved by winding a pair of conductors in bifilar fashion to form a bifilar winding, and laterally displacing alternate turns of the bifilar winding with respect to the remaining turns to provide a pair of coextensive laterally displaced coils, adjacent turns of which are interleaved partially to overlap one another.

A further object is to provide a novel two-conductor line of general utility.

Other and further objects will be explained hereinafter and will be more particularly pointed out in the appended claims.

The invention will now be described in connection with the accompanying drawing

Figs. 1 and 2 of which are perspective views illustrating successive steps in the preferred method of making the line of the present invention;

Fig. 3 is an end elevation of the line, and

Figures 4, 5:
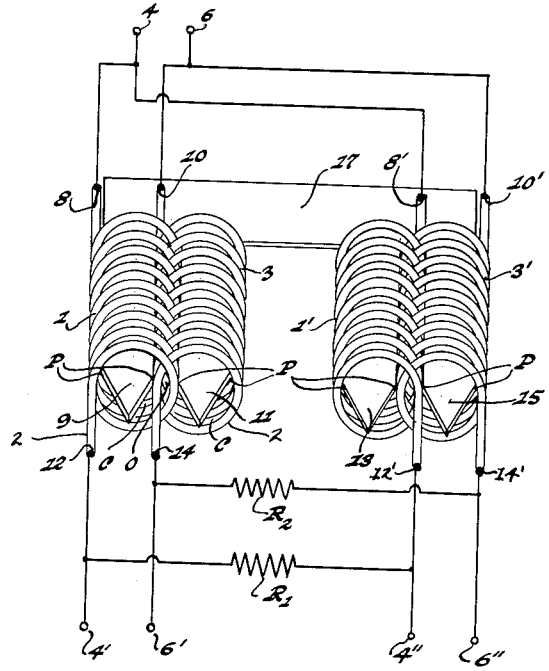
Figs. 4 and 5 are views similar to Fig. 1 of modified constructions.

Referring to Fig. 1, a bifilar winding is formed by simultaneously winding adjacent conductors 1 and 3, insulation covered as at 2, about a mandrel 5, as is well known. The conductors may be of any desired type such as, for example, copper wire covered with nylon or enamel insulation 2. The resulting bifilar winding 1, 3 is then modified by laterally displacing the conductor windings 1 and 3. This may be effected by introducing a preferably pointed member 7, Fig. 2, at the first turn I of the winding 1, prying it outward to the right; proceeding past the adjacent left-hand turn I' of conductor 3 to the next turn II of conductor 1 and prying it outward; and so on. Alternate turns of the bifilar winding 1, 3 (in this case, the turns I, II, etc. of conductor 1) are thus laterally displaced from the remaining turns (I', II', etc. of conductor 3).

This results, as more clearly shown in Fig. 3, in spacing major portions C of each turn of conductors 1 and 3 transversely from one another, leaving only a small and, if desired, minimal, overlapped portion O of oval configuration at which the adjacent turns I, I', etc. of conductors 1 and 3 are coupled by substantial capacitance, shown dotted at $C^1$. As compared with the before-mentioned prior-art transmission lines or bifilar elevator coils and the like, the transmission line formed by the interleaved laterally displaced coils 1 and 3, therefore, has very little capacitance per unit length. This is because the only substantial capacitance ($C^1$) between the conductors of the line exists in the region O where the conductors 1 and 3 are close together and at the regions X where they cross. Principal portions C of each unit-length of the conductors of the line, such as each turn of the coils 1 and 3, remain remote from another and thus there is little capacitance therebetween. A considerably higher characteristic impedance can thus be obtained by this construction than conventional lines, elevator coils and the like can provide.

Once the laterally displaced interleaved line 1, 3 is formed, of course, it is necessary that there be no relative lateral movement of the coils 1 and 3, as otherwise the value of the capacitance per unit length and hence the characteristic impedance of the line will vary from the value predetermined by the selected dimensions or degree of overlap O. This end may be achieved with the aid of insulating forms or spacers.

In Fig. 4, the insulating spacer is shown in the form of four planar tongues 9, 11, 13 and 15, extending substantially parallelly from a common transverse planar support 17. The transmission line 1, 3 is shown formed about the pair of tongues 9, 11, the lateral edges of which contact opposed lateral points P of the coils to maintain them rigidly in the desired position. The tongues extend within and along the displaced and non-overlapped portions C of the coils 1 and 3. In fact, the tongues 9 and 11 may serve the function of the member 7 of Fig. 2 in effecting the lateral separation of the coils 1 and 3, insuring that each turn is displaced the same predetermined distance to provide the required overlap O and is maintained against transverse movement. By providing a similar transmission line 1', 3' about the pair of tongues 13, 15, a radio-frequency directional coupler may be formed. As explained in United States Letters Patent No. 2,776,408, issued January 1, 1957, to the applicant Ben H. Tongue, herein, the lines in such couplers may act as substantially quarter-wave transmission-line sections to permit signals to be fed, for example, between terminals 4 and 6 (connected, respectively, to upper terminals 8—8' of conductors 1 and 1' and upper terminals 10—10' of conductor 3 and 3') and a pair of output terminals 4'—6' and 4"—6". The terminals 4' and 6' connect, respectively, with the lower terminals 12—12' and 14—14' of the lines 1—1' and 3—3', through isolating impedances $R^1$ and $R^2$, for reasons and purposes explained in the said Letters Patent and which it is not necessary to repeat for an understanding of the present invention. Suffice it for the purposes of the present invention to state that this line construction is particularly suited to such purposes as radio-frequency directional couplers of this type where relatively short-sections of high-impedance line sections are required to provide the desired multiple-outlet mutually isolated coupling.

While the tongues 9 and 11 extend within the regions C external to the overlapped region O in the system of Fig. 4, the support may also be provided within the overlapped region O, as is effected by the planar tongue 19 of Fig. 5 which contacts laterally opposed points $P^1$ of the overlapped portions O of the coils 1 and 3, thus maintaining them against relative lateral movement. The tongue 19 may itself be locked within a U-shaped insulating support 21—23, the arms 21 of which are rearwardly apertured or slit, as at 21', to receive a transversely projecting support 19' at the left-hand end of the tongue 19. The neck 23 of the U-shaped support may be apertured as at 23' to receive the pointed free or right-hand end of the tongue 19. The U-shaped member 21—23 is also shown as planar, but with its plane perpendicular to that of the tongue 19. If the tongue 19 is horizontally oriented, the members 21—23 will, accordingly, be vertically oriented with the arms 21 disposed within the un-overlapped regions C of the coils 1 and 3, contacting laterally opposed points P" thereof in the vertical plane.

As an illustration, a transmission line 1, 3 of the type shown in Figs. 3 and 4, formed of 22-gauge nylon-coated copper wire wound into nineteen turns with a coil inner diameter of ⅝ of an inch and a maximum overlap O of 1/16 of an inch, provided a high characteristic impedance of about 420 ohms. This is particularly useful in VHF television-band directional couplers, baluns, elevator coils or similar transmission-line devices. Twenty-three turns of this wire, however, in the apparatus of Fig. 5, having a maximum overlap of 3/16 of an inch, provided an impedance of 175 ohms. These impedance values are considerably higher than can be obtained with ordinary bifilar or other transmission-line sections of equivalent dimensions.

While the method of formation above-described is considered to be the most economical and commercially practical, the interleaved line of the invention may also be formed in other ways, as by interleaving two separately formed coils. Further modifications will also occur to those skilled in the art and all such are considered to fall within the spirit and scope of the invention as defined in the appended claims.

What is claimed is:

1. A two-conductor transmission line comprising a pair of separate unconnected coextensive coils the turns of one of which are interleaved between the turns of the other, the coils having their axes laterally displaced from one another and having adjacent turns partially overlapping, the line having a pair of adjacent input terminals at one end of the coils and a pair of adjacent output terminals at the other end.

2. A two-conductor transmission line comprising a pair of separate unconnected coextensive insulation-covered coils the turns of one of which are interleaved between the turns of the other, the coils having their axes laterally displaced from one another and having adjacent turns partially overlapping, the line having a pair of adjacent input terminals at one end of the coils and a pair of adjacent output terminals at the other end.

3. A two-conductor transmission line comprising a pair of separate unconnected coextensive insulation-covered coils the turns of one of which are interleaved between the turns of the other, the coils having their axes laterally displaced from one another and having adjacent turns partially overlapping, the line having a pair of adjacent input terminals at one end of the coils and a pair of adjacent output terminals at the other end, and means for maintaining the coils against relative lateral movement.

4. A two-conductor transmission line comprising a two-part winding alternate turns of which are laterally displaced from the remaining turns to form a pair of separate unconnected coextensive coils having laterally displaced axes and having adjacent turns which partially overlap one another, the line having a pair of adjacent input terminals at one end of the coils and a pair of adjacent output terminals at the other end.

5. A transmission-line coupling circuit comprising two substantially parallel laterally displaced pairs of coils each as claimed in claim 4.

6. A two-conductor transmission line comprising a two-part winding of separate unconnected insulation-covered conductors alternate turns of which are laterally displaced from the remaining turns to form a pair of coextensive coils having laterally displaced axes and having adjacent turns which partially overlap one another, the line having a pair of adjacent input terminals at one end of the coils and a pair of adjacent output terminals at the other end and an insulating form disposed within and along the coils and contacting laterally opposed portions of the coils to prevent relative lateral movement of the same.

7. A two-conductor transmission line comprising a two-part winding of separate unconnected insulation-covered conductors alternate turns of which are laterally displaced from the remaining turns to form a pair of coextensive coils having laterally displaced axes and having adjacent turns which partially overlap one another, the line having a pair of adjacent input terminals at one end of the coils and a pair of adjacent output terminals at the other end and an insulating form comprising a pair of tongues one disposed within and along each of the non-overlapped portions of the coils and contacting laterally opposed portions of the coils to prevent relative lateral movement of the same.

8. Apparatus as claimed in claim 7 and in which the tongues are substantially planar members extending substantially parallelly from a common transverse support.

9. A two-conductor transmission line comprising a two-part winding of separate unconnected insulation-covered conductors alternate turns of which are laterally displaced from the remaining turns to form a pair of coextensive coils having laterally displaced axes and having adjacent turns which partially overlap one another, the line having a pair of adjacent input terminals at one end of the coils and a pair of adjacent output terminals at the other end and an insulating form comprising a tongue disposed within and along the overlapped portions of the coils and contacting laterally opposed portions of the same to prevent relative lateral movement thereof.

10. Apparatus as claimed in claim 9 and in which the tongue is a substantially planar member that is received within a U-shaped insulating form, the arms of which are inserted in planes substantially perpendicular to that of the tongue within the non-overlapped portions of the coils.

11. Apparatus as claimed in claim 10 and in which the neck of the U is apertured to receive the free end of the tongue and the other end of the tongue is provided with a transverse support received within apertures in the free ends of the arms of the U.

12. A transmission-line coupling circuit comprising two substantial parallel laterally displaced pairs of coils as claimed in claim 7 and in which the tongues of the insulating forms of each pair of coils all extend substantially parallelly from a common transverse support.

References Cited in the file of this patent

UNITED STATES PATENTS

| 2,178,653 | Slade | Nov. 7, 1939 |
| 2,470,307 | Guanella | May 17, 1949 |
| 2,471,777 | Reinartz | May 31, 1949 |
| 2,550,891 | Wald | May 1, 1951 |
| 2,816,273 | Peck | Dec. 10, 1957 |

FOREIGN PATENTS

| 981,016 | France | Jan. 10, 1951 |